United States Patent
Just et al.

(10) Patent No.: US 6,235,362 B1
(45) Date of Patent: May 22, 2001

(54) ASSEMBLY OF AT LEAST TWO COMPONENTS TO BE SECURED TOGETHER

(75) Inventors: Bernhard Just, Kernen; Rudolf Baumann, Schwieberdingen; Manfred Bofinger, Ludwigsburg; Thomas Ullman, Backnang; Bernhard Kull, Remshalden; Ulrich Stahl, Schwieberdingen; Rolf Bald, Bad Wimpfen; Hans-Juergen Herderich, Kernen; Rolf Bischof, Fischbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/930,969
(22) PCT Filed: Mar. 23, 1996
(86) PCT No.: PCT/DE96/00509
  § 371 Date: Oct. 6, 1997
  § 102(e) Date: Oct. 6, 1997
(87) PCT Pub. No.: WO96/32241
  PCT Pub. Date: Oct. 17, 1996

(30) Foreign Application Priority Data

Apr. 8, 1995 (DE) .............................. 195 13 465

(51) Int. Cl.$^7$ ................................. B29C 45/14
(52) U.S. Cl. ................. 428/36.9; 428/212; 324/207.13; 324/207.22; 174/52.3
(58) Field of Search .................. 428/36.9, 212; 427/421; 340/936, 466, 467, 669, 670; 324/173, 179, 207.11, 207.13, 207.15, 207.22; 174/52.3

(56) References Cited

U.S. PATENT DOCUMENTS

| 2,956,312 | | 10/1960 | Naimer | 18/59 |
|---|---|---|---|---|
| 3,268,645 | * | 8/1966 | Stampfli | 264/272 |
| 3,451,021 | * | 6/1969 | Atherton | 335/260 |
| 3,662,460 | * | 10/1972 | Daley | 29/605 |
| 4,682,136 | * | 7/1987 | Prokop | 335/282 |
| 5,153,052 | * | 10/1992 | Tanaka et al. | 428/212 |

FOREIGN PATENT DOCUMENTS

3642246  * 12/1986  (DE) .

OTHER PUBLICATIONS

Derwent Abstract of DE 3642246A, Shroeder, Dec. 1986.*

* cited by examiner

Primary Examiner—Rena L. Dye
Assistant Examiner—Alicia Chevalier
(74) Attorney, Agent, or Firm—Michael J. Striker

(57) ABSTRACT

An arrangement of two elements to be connected to each another of thermoplastic material is proposed. For instance, an annular coil (7) is disposed in a tight housing; the housing (8) and the coil body (1) comprise the thermoplastic material with different melting points, and the two intermesh with one another via grooves. The housing (8) sheathes a coil end plate (3), in the form of an extension, almost completely on at least one side, that is, the side on which the coil end plate is disposed. On the other face end (4) and on the outer circumference of the coil end plate (3), the coil end plate (3) has annular grooves (5, 6), into which the thermoplastic material of the housing (8) can be introduced during the sheathing in a hardening manner.

2 Claims, 2 Drawing Sheets

ASSEMBLY OF AT LEAST TWO COMPONENTS TO BE SECURED TOGETHER

BACKGROUND OF THE INVENTION

The invention relates to an arrangement of at least two elements to be connected to each other and to a method for producing such an arrangement.

A coil body and a housing, as elements to be connected to each other, in which the elements are made up of thermoplastic material, is already known from U.S. Pat. No. 2,956, 312. The cylindrical coil body has wedge-shaped annular grooves in one region of its outer cylinder jacket; the coil itself is fastened between one part of the coil body, which serves as an end plate for the coil, and a disk retained on the cylinder. At high temperatures, both the thermoplastic material and the housing can fuse together in some regions during assembly, producing a tight cohesion of these parts to each other. The annular grooves on the coil body and an additional annular groove on the coil end plate effect a firm hold by their intermeshing with the material comprising the housing.

In arrangements subject to especially severe mechanical and thermal strains, such as in rpm sensors in motor vehicles, developing cracks at the connecting points can lead to gaps, through which moisture, for instance, can pass. As the thermoplastic material hardens as well, shrinkage can create a gap between the coil body and the housing that impairs the functioning of the arrangement.

SUMMARY OF THE INVENTION

Accordingly, it is an object of the present invention to provide an arrangement of the above mentioned type which avoids the disadvantages of the prior art.

In keeping with these objects and with others which will become apparent hereinafter, one feature of present invention resides, briefly stated, in an arrangement of at least two elements to be connected to each other, wherein a groove located on the circumference of the extension has an outer dovetail-like edge with an acute angle of less than 50°, and on the outer face end of the extension at least two wedge-shaped annular grooves are located, which have a sawtooth-like geometry.

When the arrangement is designed in accordance with the present invention, it has the advantage that optimal cohesion of the two elements of the arrangement is assured by the selection of materials and the geometrical design of an extension on the first element.

With the other characteristics, the arrangement of the invention is advantageously improved further. The complete sheathing of the first part having the extension, the sheath being drawn axially around the extension for instance and in the process engaging the grooves, assures in a simple way that virtually all the forces that can cause crack development during the operation of the arrangement will be absorbed. In particular, the sharp-edged, dovetail-like border on the outer circumference of the extension leads to a stable retention of the sheath on the first element of the arrangement.

In accordance with an exemplary embodiment with an arrangement in the form of a sensor, a tight bond between a coil body, which has a coil end plate in the form of an extension, and the sheath of the housing is achieved; to that end, these elements comprise thermoplastic material, with the outer material having a higher melting point. As a result, when the coil end plate is spray-coated, particularly in the region of the grooves, material is melted, thus forming a tight bond between the coil end plate and the sheath. For the tight bond, the advantageous embodiment of the grooves, particularly on the circumference of the coil end plate, is also important. This annular groove here has a back wall extending approximately parallel to the face end. The front end of this annular groove is formed at an acute angle to the back wall. In addition, the grooves on the outer face end of the coil end plate are embodied in sawtooth fashion, thus producing a tight bond with the region of the sheath that embracingly engages the coil end plate as well.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
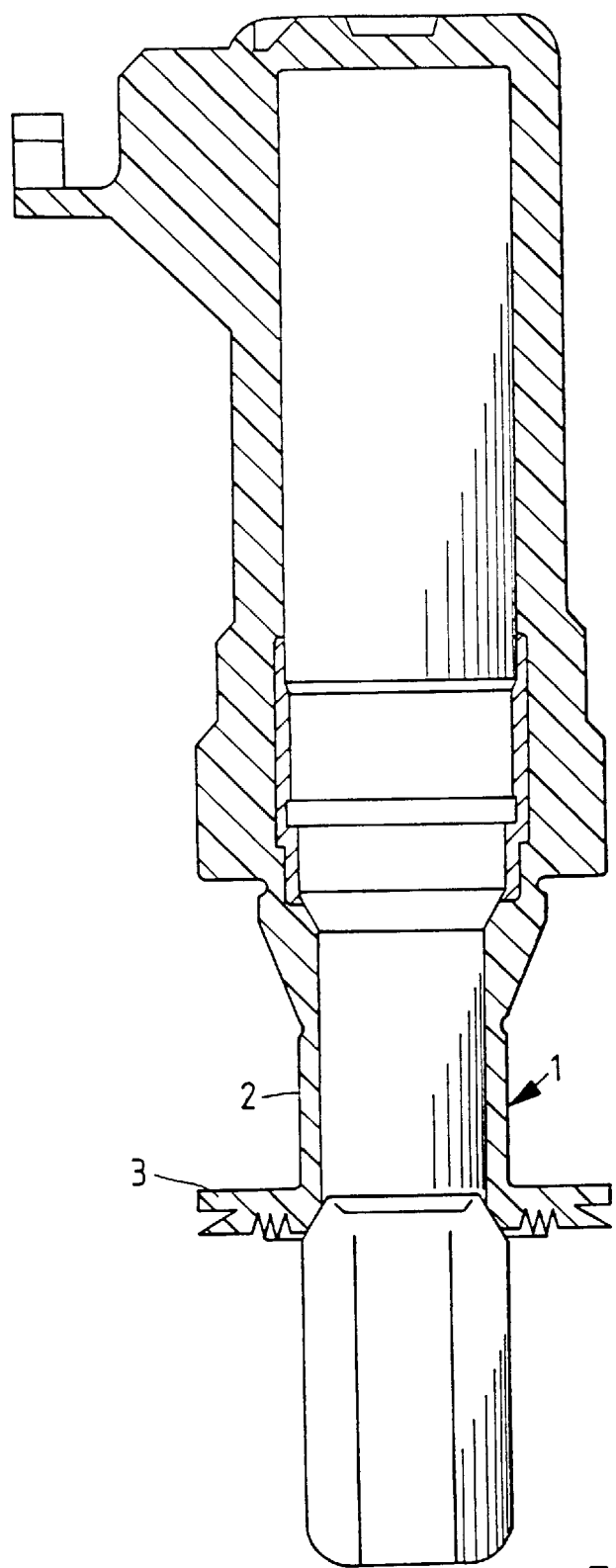
FIG. 1, a section through an arrangement with a coil body on which an inductive rpm sensor can be mounted.

In FIG. 1, the coil body 1 is shown as the first element, in which in a later production stage a coil can be wound onto the winding face 2. On one end, the coil body 1 has a coil end plate 3 as an extension, which fixes the coil in its position. The coil end plate 3 is embodied here as a flangelike extension of the coil body 1 that extends approximately transversely to the axis of the coil body 1 and serves as a boundary for the coil. The coil body 1 is made of a thermoplastic material, preferably a polyamide (PA6) with a melting point of approximately 220° C. The coil, as a component of an inductive rpm sensor, is intended to detect rotary motions of a metallic element that during its rotary motion affects the magnetic field of the coil.

Figure 2:
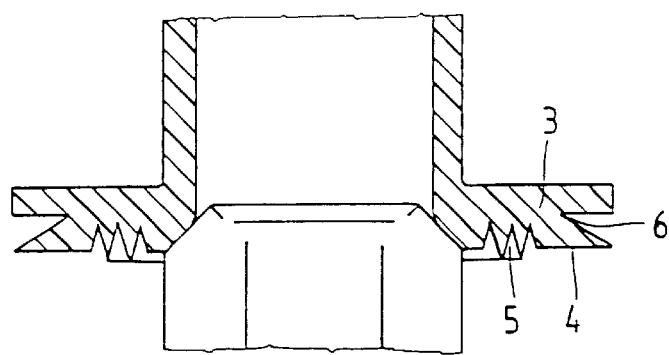
FIG. 2, a section through a detail of the arrangement of FIG. 1 having a coil end plate.

FIG. 2 shows the coil end plate 3 in detail, so that wedge-shaped annular grooves 5 disposed on the face end 4 and an annular groove 6 disposed on the outer circumference are especially clearly apparent. The outer annular groove 6 is designed such that a dovetail-like encompassing edge having an acute angle of less than 50° results. The annular grooves 5 disposed on the face end 4 protrude slightly past the surface of the face end 4.

Figure 3:
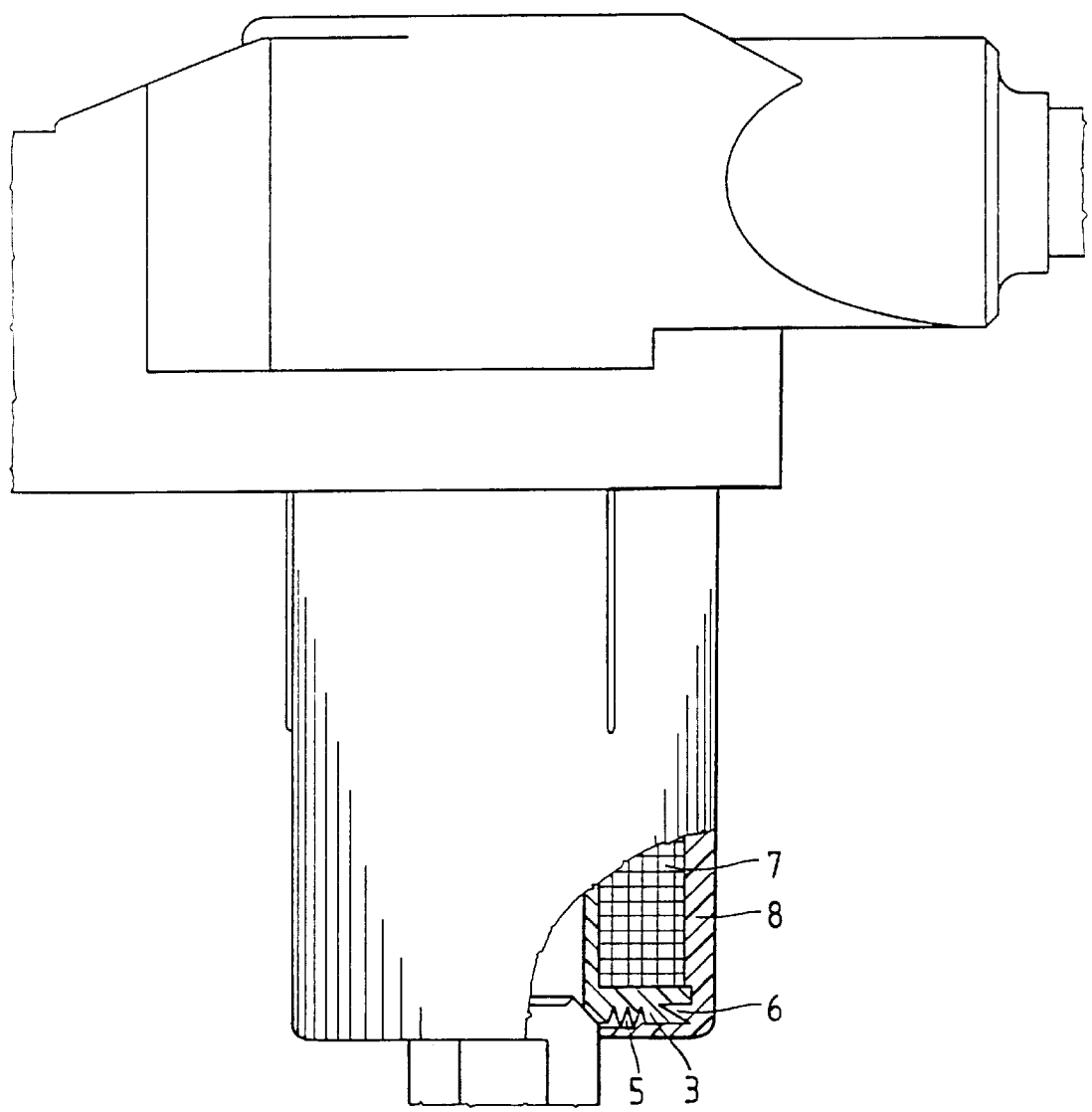
FIG. 3, a section through an arrangement with finished sheathing, in the exemplary embodiment of FIG. 1.

FIG. 3 shows the already-sheathed coil arrangement for an rpm sensor, not described in further detail here, that has a coil 7 and a sheath, in the form of its housing 8, comprising a thermoplastic material, such as polyamide (PA66) with a melting point of approximately 255° C. The sheath 8 is drawn all the way around the coil end plate 3 here, using a spray-coating technique. During the spray-coating, fusing by melting occurs in the region of the annular grooves 5 and particularly in the region of the groove 6, to form a firm, durable, tight bond of the two elements 3 and 8.

What is claimed is:
1. An arrangement, comprising at least two elements connected to each other, said elements being comprised of thermoplastic material and including a first element com- prised of a material with a lower melting point than a material of a second element connected to said first element, one of said elements having a flange-shaped extension and being provided on a circumference of said extension and on an outer face end of said extension with at least one annular groove in which a material of the other element is introduced so that the materials of the elements are melted with one another and the other element surrounds said one element, said annular groove on said circumference of said extension having an outer dovetail-shaped edge with an acute angle of less than 50°, and said annular groove on the outer face end being formed as at least two wedge-shaped annular grooves having a sawtooth-shaped geometry.

2. An arrangement as defined in claim 1, wherein said one element is formed as a coil body, said extension is formed as a coil end plate, and said other element is formed as a housing.

* * * * *